(12) United States Patent
Alexander et al.

(10) Patent No.: US 10,334,319 B2
(45) Date of Patent: Jun. 25, 2019

(54) SYSTEM AND METHOD OF CLOUD-BASED MANIFEST PROCESSING

(71) Applicant: CHARTER COMMUNICATIONS OPERATING, LLC, St. Louis, MO (US)

(72) Inventors: James H. Alexander, Denver, CO (US); Douglas M. Ike, Denver, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 15/250,098

(22) Filed: Aug. 29, 2016

(65) Prior Publication Data

US 2018/0063594 A1 Mar. 1, 2018

(51) Int. Cl.
| | |
|---|---|
| *H04N 7/167* | (2011.01) |
| *H04N 21/4627* | (2011.01) |
| *H04L 29/08* | (2006.01) |
| *H04N 21/2347* | (2011.01) |
| *H04N 21/266* | (2011.01) |
| *H04N 21/2662* | (2011.01) |
| *H04N 21/254* | (2011.01) |
| *H04N 21/2343* | (2011.01) |
| *H04N 21/262* | (2011.01) |
| *H04N 21/6408* | (2011.01) |
| *H04N 21/658* | (2011.01) |
| *H04N 21/845* | (2011.01) |

(52) U.S. Cl.
CPC ......... *H04N 21/4627* (2013.01); *H04L 67/10* (2013.01); *H04N 21/2347* (2013.01); *H04N 21/23439* (2013.01); *H04N 21/2541* (2013.01); *H04N 21/2662* (2013.01); *H04N 21/26258* (2013.01); *H04N 21/26613* (2013.01); *H04N 21/6408* (2013.01); *H04N 21/6581* (2013.01); *H04N 21/8456* (2013.01)

(58) Field of Classification Search
CPC .. H04N 7/1675; H04N 7/163; H04N 7/17336; H04N 7/17318; H04N 7/17309; H04N 7/173; H04N 21/4181; H04N 21/26606; H04N 21/435; H04N 21/47202; H04N 21/812; H04N 21/23106; H04N 21/235
USPC .................. 725/31, 87–93, 114–116, 34–36; 709/217–232
See application file for complete search history.

(56) References Cited

U.S. PATENT DOCUMENTS

| | | | | |
|---|---|---|---|---|
| 8,688,991 | B1* | 4/2014 | Sunil | H04L 63/06 380/30 |
| 8,949,592 | B2* | 2/2015 | Moroney | H04L 63/10 713/151 |
| 9,038,116 | B1* | 5/2015 | Knox | H04L 12/2805 709/219 |
| 9,112,934 | B2* | 8/2015 | Um | H04N 21/2385 |
| 9,167,311 | B2* | 10/2015 | Busse | H04N 21/23439 |
| 9,230,126 | B2* | 1/2016 | Handal | G06F 21/10 |

(Continued)

*Primary Examiner* — Annan Q Shang
(74) *Attorney, Agent, or Firm* — Meagher Emanuel Laks Goldberg & Liao, LLP

(57) ABSTRACT

Systems, methods, architectures, mechanisms or apparatus for using provider equipment based resources such as cloud or data center resources to implement various STB functions entirely at the head end, such as changing channels presented via the STB using PE actions only.

18 Claims, 6 Drawing Sheets

(56) References Cited

U.S. PATENT DOCUMENTS

| | | | |
|---|---|---|---|
| 9,491,499 B2* | 11/2016 | Wagenaar | H04N 21/26258 |
| 2006/0005026 A1* | 1/2006 | Song | H04L 9/0844 |
| | | | 713/173 |
| 2010/0169935 A1* | 7/2010 | Abbruzzese | G11B 5/584 |
| | | | 725/62 |
| 2011/0145858 A1* | 6/2011 | Philpott | G06Q 30/02 |
| | | | 725/32 |
| 2013/0305039 A1* | 11/2013 | Gauda | G06F 21/6218 |
| | | | 713/153 |
| 2014/0026052 A1* | 1/2014 | Thorwirth | G06F 3/01 |
| | | | 715/721 |
| 2014/0173040 A1* | 6/2014 | Newton | H04L 41/0893 |
| | | | 709/219 |
| 2014/0270161 A1* | 9/2014 | Shamsaasef | H04N 21/4405 |
| | | | 380/44 |
| 2016/0182966 A1* | 6/2016 | Hao | H04N 21/234 |
| | | | 725/116 |
| 2016/0323606 A1* | 11/2016 | Mao | H04L 43/0876 |
| 2017/0171610 A1* | 6/2017 | Nair | H04N 21/2362 |
| 2017/0332114 A1* | 11/2017 | Turgut | H04L 65/1069 |
| 2018/0014041 A1* | 1/2018 | Chen | H04N 21/2347 |
| 2018/0302452 A1* | 10/2018 | Pantos | H04L 65/1083 |

* cited by examiner

SYSTEM AND METHOD OF CLOUD-BASED MANIFEST PROCESSING

FIELD OF THE DISCLOSURE

The present disclosure generally relates to communications networks and, more particularly but not exclusively, to systems distributing content such as television channels to subscribers.

BACKGROUND

Within the context of content distribution systems such as cable television systems the delivery of video using IP technology currently requires complex customer premises equipment (CPE) such as a set top boxes (STBs), cable modems and the like interacting with provider equipment (PE) such as head-end and/or neighborhood servers installed and/or virtualized at a provider or third party data center. Customer interactions with a STB to request specific content, change displayed broadcast channels and the like require a complex coordination between the CPE and PE system components that deliver the content video streams, protect the content with digital rights management (DRM), establish and define Quality of Service (QoS) levels and provide other key functions of a quality video service.

SUMMARY

Various deficiencies in the prior art are addressed by systems, methods, architectures, mechanisms or apparatus for using provider equipment based resources such as cloud or data center resources to implement various STB functions entirely at the head end, such as changing channels presented via the STB using PE actions only.

For example, a method of securely delivering content according to one embodiment comprises transmitting, from a head end toward each of a plurality of client devices, a digital rights management (DRM) license key configured to enable decrypting of video stream portions by a video decoder of an authorized client device, said video stream portions being stored in respective storage locations at said head end as indicated by a manifest; receiving, from an authorized client device, clickstream data indicative of user interaction with said authorized client device to select thereby a video stream; and storing, in said plurality of default storage locations, respective portions of said user selected video stream.

A system according to one embodiment comprises a stream server configured for transmitting toward each of a plurality of client devices at least one respective video stream comprising a sequence of encrypted video stream portions stored in respective storage locations at said head end as indicated by a respective manifest, each sequence of encrypted video stream portions being configured for decryption via a video player using a respective session playback key; a manifest creation and manipulation module configured for adapting a client device manifest in response to respective client device selection data indicative of a desired new video stream; and an interaction module configured for receiving data indicative of user interactions at a client device.

A system in accordance with another embodiment comprises a stream server configured for transmitting toward each of at least one client device a respective sequence of encrypted video stream portions as defined by a respective manifest, each sequence of encrypted video stream portions being configured for decryption via a respective session playback key; a manifest creation and manipulation module configured for adapting a client device manifest in response to respective client device selection data and a license key; and an interaction module configured for receiving data indicative of user interactions at a client device.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments will be described within the context of a cable television system. However, it will be appreciated by those skilled in the art that the various embodiments find utility within the context of any system providing broadcast television channels and/or other content to client devices in accordance with a manifest or other mechanism for mapping channel/content to available delivery means.

In the disclosed embodiments, a manifest file is used to identify the sequence of video stream segments (e.g., segments of 1 second, 2 seconds, 10 seconds or some other amount of time) forming a video stream (e.g., content stream), including available video stream segments having different bitrates such as for the same sequence portion. In this manner, higher bitrate segments may be utilized on a bandwidth availability basis to provide improved presented video quality at the client device. The manifest file may be used at the server, client device or combination of server and client device as discussed herein.

Figure 1:
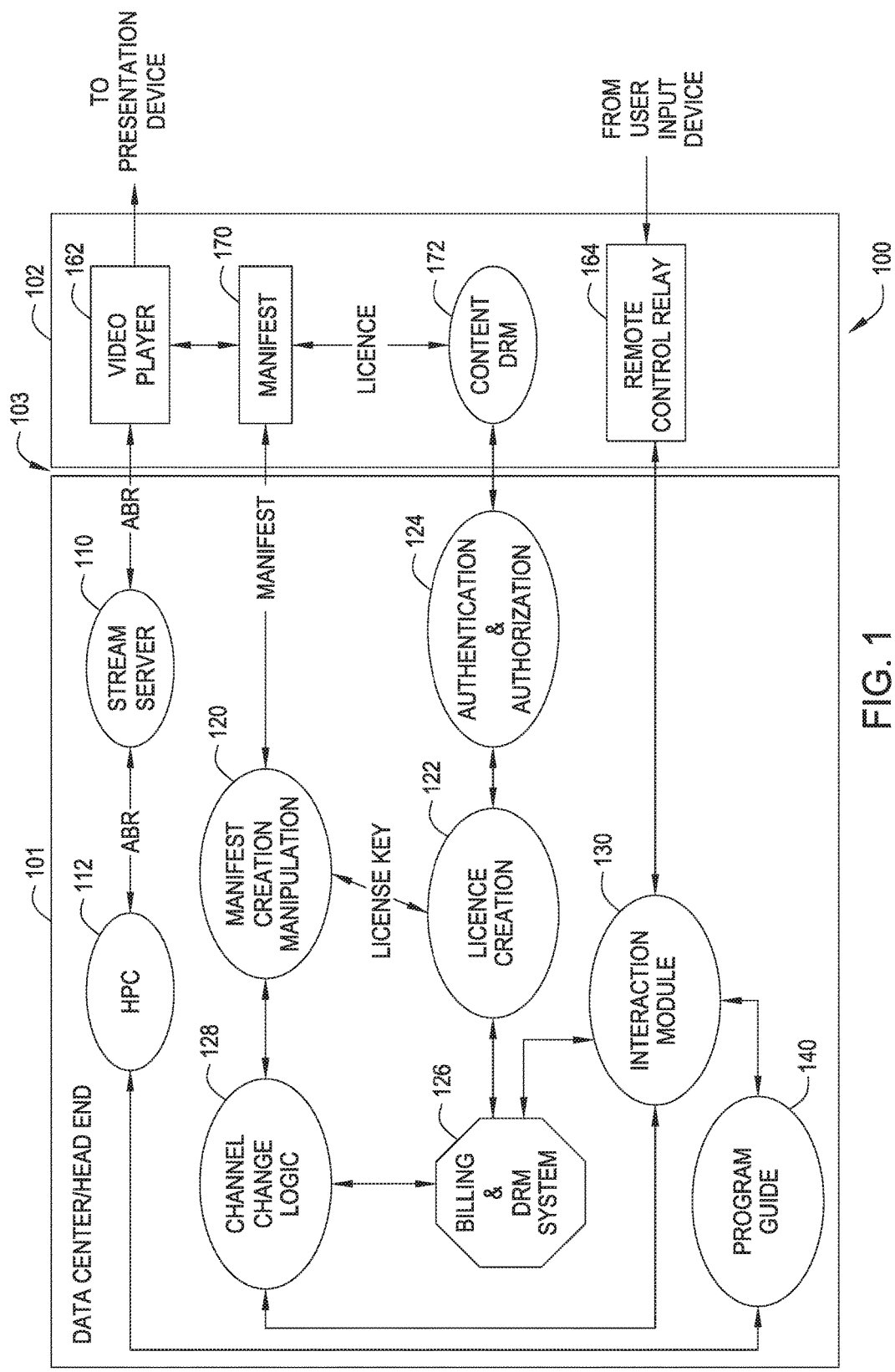
FIGS. 1-3 depict a high-level block diagrams of systems benefiting from various embodiments.

FIG. 1 depicts a high-level block diagram of a system benefiting from various embodiments. Specifically, FIG. 1 depicts a portion 100 of a content distribution system; namely, the head end 101 communicatively coupled to each of a plurality of client devices 102 (only one client device is depicted) via a network 103.

The content distribution system 100 may comprise a cable television system, satellite distribution system, computer network and the like in which audiovisual streams deliver on demand and/or broadcast content to subscribers. Such systems may have many head ends where each head end communicates with a respective group of client or subscriber devices. Further, such systems may communicate with subscriber devices through a single network or through a plurality of networks.

In various embodiments, the head end 101 as well as other provider equipment (PE) may be implemented as virtual entities within a data center. In various embodiments, the client device 102 and other customer premises equipment (CPE) may comprise a set top box (STB), cable modem and/or other client device capable of interacting with the head end 101 via the network 103 to perform the various functions described herein. The head end 101 includes a network interface (not shown) supporting communication between the head end 101 and the network 103, such as for streaming media, data and so on.

In various embodiments, the network 103 comprises one or more Internet protocol (IP) networks such as access networks, core networks and so on capable of supporting the various medications as described herein. It will be appreciated by those skilled in the art that various details have been omitted to simplify the discussion it figures.

The head end 101 comprises various PE modules which may be implemented individually or in combination to perform the various functions described herein. These PE modules may be instantiated as virtual modules within the context of a data center, implemented as hardware or combination of hardware and software on one or more servers, or any combination thereof.

In various embodiments, each of the client devices 102 as well as other customer premises equipment (CPE) may be implemented individually or in combination to perform the various functions described herein. These CPE modules may be implemented within the context of an IP-network connected client device, such as a set top box, network-connected computer, smart phone and so on.

The client device 102 is generally described herein within the context of an IP-enabled STB within a content distribution system such as a cable television system. The client device 102 includes a network interface (not shown) supporting communication between the client device 102 and the network 103, such as for streaming media, data and so on.

A stream server 110 operates to provide video streams (more generally content streams including video, audio and/or associated data streams as appropriate) for transmission toward the client device 102 via the network 103. The provided video streams may comprise content streams such as requested movies or other content, broadcast television streams, streams displaying electronic program guides or user interfaces and so on.

The provided video streams are transmitted via one or more predefined transmission channels, such as via unicast transmission between the head end 101 and a particular client device 102. Various types of transmission channels may be employed within the context of the embodiments discussed herein depending upon the type of PE, CPE and network topology used to deliver content/video streams to client devices.

For purposes of this discussion it will be assumed that the provided video streams comprise adaptive bit rate (ABR) video streams encrypted in accordance with digital rights management (DRM) requirements of content providers such that only client devices with the appropriate authorization are able to make use of the provided video streams.

In various embodiments, each device such as a STB receives its own video stream at all times.

In various embodiments, some or all of the plurality of devices may receive a common video stream (e.g., such as a video/content stream associated with a live sporting event or broadcast channel) which may be decrypted by each of the multiple client devices via the same session playback key. The common video stream may be provided to the multiple client devices by a single common transmission channel or respective transmission channels. Further, the client devices may be logically or physically divided into groups (e.g., geographic/neighborhood groups, device type groups, subscription level groups, service level groups and the like) wherein each group may be associated with a respective session playback key and/or a respective transmission channel.

For purposes of this discussion it will be assumed that each of the video streams is divided into a plurality of portions, where each portion is associated with a respective file or link thereto, and where each of the files or links thereto forming a video stream are listed or otherwise identified within a respective manifest such that the video stream portions may be fetched and otherwise processed in the appropriate order at a client device to recover therefrom video (and audio) data suitable for use by, illustratively, audiovisual presentation devices. Thus, the a stream server is configured for transmitting toward each of at least one client device a respective sequence of encrypted video stream portions as defined by a manifest, wherein each sequence of encrypted video stream portions is configured for decryption by an authorized client device video player via a respective session playback key.

A manifest creation and manipulation module (MCMM) 120 is configured to create, revise and otherwise manipulate a respective manifest associated with each of one or more video streams provided by the stream server 110 for use by the various client devices 102. For example, MCMM 120 creates a manifest associated with a first video stream to be provided by the stream server 110 for use by a particular client device 102 (e.g., an initially selected television channel). If the particular client device 102 selects a second video stream (e.g., a second television channel), the MCMM 120 reconfigures or manipulates the manifest to reflect the files or links thereto associated with the second video stream. Thus, the manifest creation and manipulation module is configured for adapting each manifest in response to respective client device selection data so that the stream server 120 retrieves the appropriate video stream portions for inclusion in the sequence of video stream portions transmitted to the respective client device.

A license creation module (LCM) 122 cooperates with a billing and DRM system (BDS) 126 and an authentication and authorization module (AAM) 124 to generate a license key for use by the MCMM 120. In various embodiments the AAM will cause the modification of content protection normally associated with a video stream (e.g., DRM, CAS and the like) at the head end to support appropriate DRM or link level encryption to thereby protect content delivered to a STB.

The AAM 124 communicates with a client device 102 to authenticate the client device 102 as authorized to receive service from the service provider via the head end 101, and (if authenticated) to establish a session with the client device to enable and otherwise authorize the particular subscriber services to be provided (e.g., broadcast television, premium subscription networks if appropriate, movies on demand and so on).

The BDS 126 ensures that appropriate encryption and other security measures are taken with respect to content provided to a client device 102. Further, the BDS 126 ensures that appropriate billing functions are performed with respect to such content.

A user interaction module 130 receives data indicative of user interactions at a client device 102 such as via a remote control device or other user input device. Such user interactions may comprise channel up or next channel selection, channel down or previous channel selection, selection of a specific channel number, selection of a specific channel name, selection of administrative functions, navigation or content selection inputs related to a navigation screen or menu such as part of a graphical user interface (GUI), electronic programming guide (EPG) and so on.

Within the context of the various embodiments, the particular user interactions of interest are those user interactions which result in the stream server 110 providing a new video stream to the client device 102, whether that new video stream comprises a content stream or a program guide stream. The new video stream to be provided, as with any video stream presently provided, may represent one-demand content, broadcast channel content, program guide imagery and the like as described herein. The new video stream to be provided, as with any video stream presently provided, will comprise a plurality of stream segments identified via a manifest.

The user interaction module 130 cooperates with the BDS 126 to provide user interaction information indicative of new channel selection functions, such as on-demand content selection, new channel selection, and channel up/down indication information. In response, the BDS 126 determines whether the newly selected content or channel is available to, or otherwise appropriate for, the client device (e.g., part of the relevant subscription or service level agreement) and whether any billing actions should be taken.

The user interaction module 130 cooperates with channel change logic 128 to provide user interaction information indicative of new channel selection functions, such as on-demand content selection, new channel selection, and channel up/down indication information. In response, the channel change logic 128 provides to the MCMM 120 information by which the manifest may be updated. For example, if user interaction indicative of a channel increment request is received, the channel change logic 128 provides information to the MCMM 120 enabling the generation of manifest information. Optionally, such information is only provided if the BDS 126 has determined that the proposed new channel or content is appropriate to provide to the client device 102.

The user interaction module 130 cooperates with a program guide module (PGM) 140 to provide thereto user interaction information indicative of program guide related functions, such as user selection or manipulation of administrative functions, program guide functions, menu navigation functions, user interface functions and the like. In response, the PGM 140 may provide program guide imagery, user interface imagery, menu imagery and the like to the stream server 110 via the HPC 112 for transmission to the client device as part of a cloud-based user interface or program guide.

The client device 102 is depicted as including a video player 162, a manifest processing module 170, a DRM manager 172 and a remote control relay 164.

The video player 162 is configured to tune, demultiplex or otherwise select a stream transport channel (e.g., the unicast transmission), extract the various stream portions provided therein, decrypt these stream portions as needed, decode these stream portions to provide video and audio presentation signals and propagate such audiovisual presentation signals toward presentation devices such as a television, a home theater and the like.

In various embodiments, the stream transport channel comprises a unicast channel through which all data passing therethrough is associated with a video stream to be processed for subsequent presentation.

In various embodiments, the video player receives a QAM stream via the identified channel, demultiplex the identified channel from the QAM stream to extract an encrypted video stream, decrypts the encrypted video stream using the session playback key, and generates a presentation signal for output to a presentation device.

In various embodiments, the client device 102 session control program operates to authenticate the STB to the service provider using the KLAD process, establish a session with the head end session manager, receive from the head end session manager a session playback key and a channel identifier, and provide the session playback key and channel identifier to a video player.

The DRM manager 172 cooperates with the authentication and authorization module (AAM) 124 to generate a license key for use by the manifest processing module 170 if the client device 102 is authorized to view the video stream provided by the stream server 110.

The manifest processing module 170 receives manifest data pertaining to the video stream provided by the stream server 110 and secured by the license key produced by license creation module 122. The manifest processing module 170 uses the license received from the DRM manager 172 to access the manifest data associated with the video stream provided by the stream server 110. If authorized (i.e., if in possession of a valid license and license key), the manifest processing module 170 cooperates with the video player 162 to enable processing of the received video stream and subsequent generation of presentation signals by the video player 162.

The remote control relay 164 cooperates with user input devices (e.g., remote controls and the like) to receive thereby data indicative of user manipulation of such devices. Such data may include channel change data, volume change data, user interface manipulation data, administrative or settings data and so on. Remote control relay propagates data indicative of user manipulations toward the user interaction module 130 of the head end 101.

The system 100 of FIG. 1 avoids complicated sharing between the client device 102 and head end 101 of the various functions necessary for channel changing, content selection, program guide interaction and the like. Specifically, in the system 100 of FIG. 1 the head end 101 performs the various manifest manipulation functions, digital rights management functions, user interaction interpretation functions and the like rather than having some of these functions performed at least in part by the client device 102. The client device 102 propagates user interaction information (e.g., remote control device keypresses) toward the head end 101 for processing, and processes received video streams for subsequent presentation.

Local Manifest

The client device 102 described above with respect to FIG. 1 includes a client-side manifest 170, which is used to identify the files or links there to of video stream portions to be fetched and processed by the video player 162 to provide thereby the ultimate presentation output desired by the user.

In one embodiment, the client-side manifest 170 comprises a standard or fixed manifest including standardized or fixed manifest data. That is, the manifest data stored in the client-side manifest 170 does not change. If there is a change in the video stream to be provided to the client device, that change is made at the stream server 110 by storing video segments or links there to associated with the new video stream in a manner corresponding to the fixed manifest data stored at the client-side manifest 170. In this manner, updating the manifest 170 at the client device 102 is unnecessary.

In one embodiment, the client-side manifest 170 is only modified by the MCMM 120. That is, the manifest data stored in the client-sized manifest 170 is only changed under control of the head end 101. If there is a change in the video stream to be provided to the client device, that change is made at the stream server 110 by storing video segments or links there to associated with the new video stream in a manner corresponding to the updated manifest data provided to the client-side manifest 170 by the MCMM 120.

In these and related embodiments, the head end 101 controls all manifest creation and manipulation functions. The client device 102 propagates user input data to the head end 101 for processing, such processing causing at times changes in storage or output of stream server 110.

Remote Manifest

Figure 2:
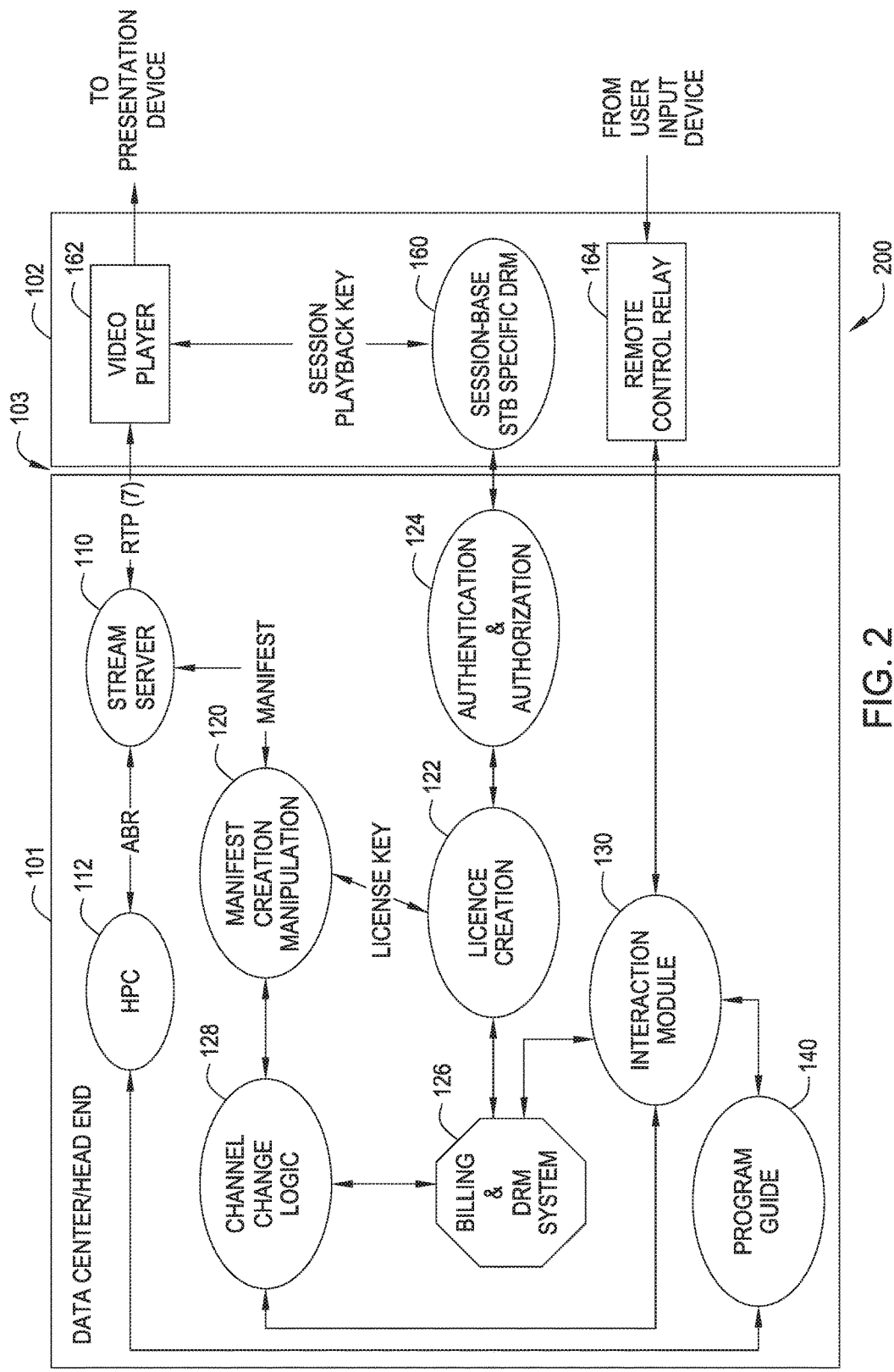

FIG. 2 depicts a high-level block diagram of a system benefiting from various embodiments. Specifically, FIG. 2 depicts a portion 200 of a content distribution system similar to that described above with respect to the system 100 of FIG. 1 but with several important differences.

First, the client device 102 depicted in the system 200 of FIG. 2 does not include local manifest 170 and, therefore, does not use a client-side process of using a manifest to fetch video stream portions for processing and presentation as provided in the system 100 of FIG. 1.

Referring to FIG. 2, it is noted that the MCMM 120 cooperates directly to the stream server 110 and is operable to cause sequential streaming of each of the segments forming the video stream to be provided to the client device 102.

Second, the client device 102 depicted in the system 200 of FIG. 2 does not include DRM manager 172 and, therefore, does not use a client-side content-based DRM process. Instead, the client device 102 depicted in the system 200 of FIG. 2 includes a session-based DRM manager 160 cooperating with AAM 124 of head end 101 to generate a session playback key for use by the video player 162.

Thus, the system 200 of FIG. 2 maintains appropriate digital rights management, subscriber compliance and so on at the head end 101 rather than at the client device 102. The stream provided to the client device via stream server 110 is controlled by the head end 101. The use of that stream by the client device 102 is controlled by the session implemented between the client device 102 and the head end 101.

Smart Remote Manifest

Figure 3:
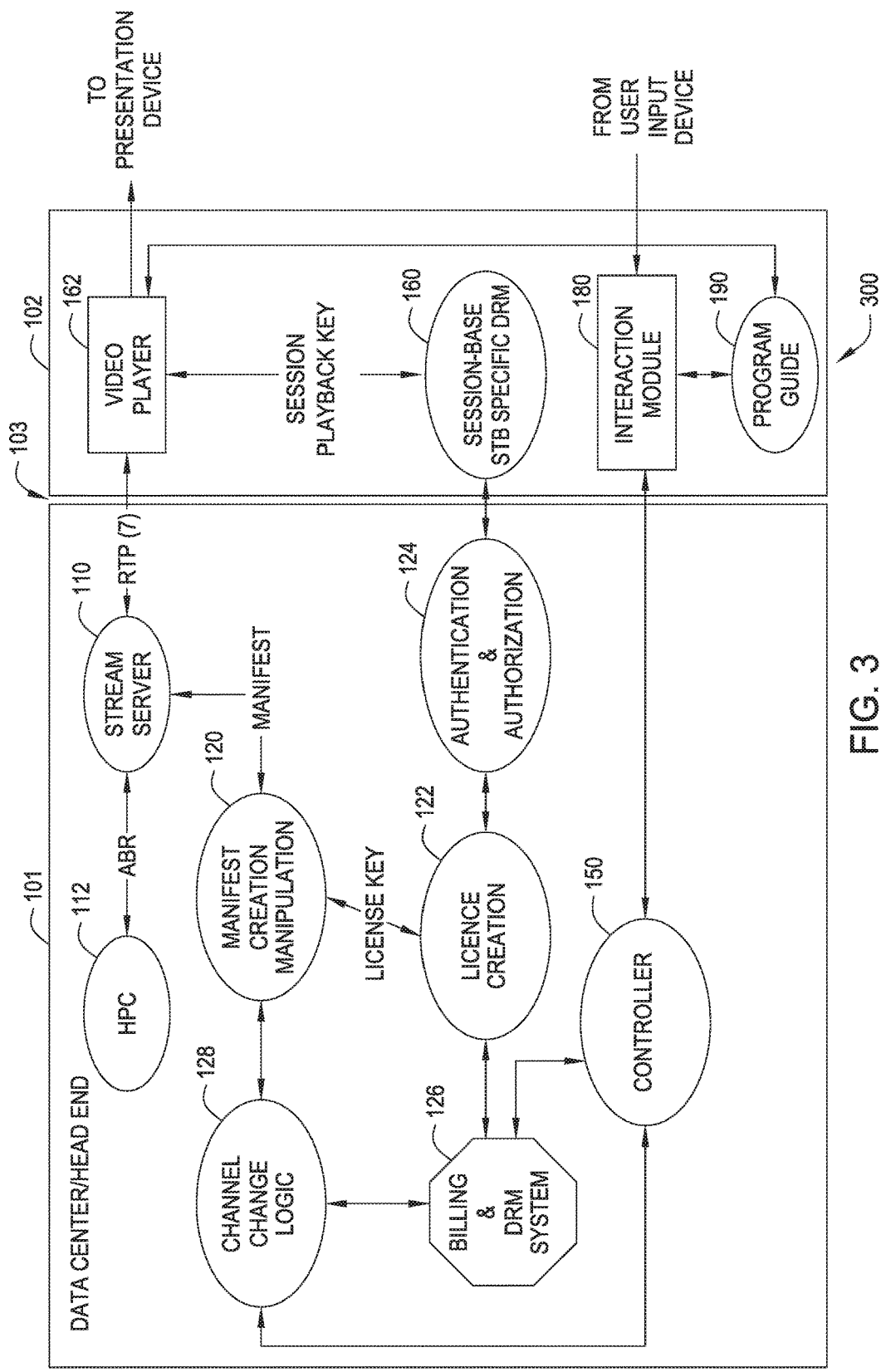

FIG. 3 depicts a high-level block diagram of a system benefiting from various embodiments. Specifically, FIG. 3 depicts a portion 300 of a content distribution system similar to that described above with respect to the system 200 of FIG. 2 but with several important differences.

The client device 102 does not include a remote control relay 164 as previously described, therefore there is no publication of substantially all of the user input information as with the systems 100 and 200 is inscribed.

Referring to FIG. 3, a client-side user interaction module 180 receives data indicative of user interactions at the client device 102 such as via a remote control device or other user input device. Such user interactions may comprise channel up or next channel selection, channel down or previous channel selection, selection of a specific channel number, selection of a specific channel name, selection of administrative functions, navigation or content selection inputs related to a navigation screen or menu such as part of a graphical user interface (GUI), electronic programming guide (EPG) and so on.

The client-side user interaction module 180 cooperates with a client-side program guide module (PGM) 190 to provide thereto user interaction information indicative of program guide related functions, such as user selection or manipulation of administrative functions, program guide functions, menu navigation functions, user interface functions and the like. In response, the PGM 190 may provide program guide imagery, user interface imagery, menu imagery and the like to the video player 162 for subsequent presentation to user as part of a fully or partially client-based user interface or program guide.

The client-side user interaction module 180 cooperates with a controller 150 at the head end 101 to provide thereto user interaction information indicative of new channel selection functions, such as on-demand content selection, new channel selection, and channel up/down indication information. In various embodiments, the client-side user interaction module 180 further cooperates with the controller 150 at the head end 101 to provide thereto the user interaction information indicative of program guide related functions.

Referring to the head end 101 of FIG. 3, the controller 150 cooperates with the BDS 126 and channel change logic 128 to provide thereto the user interaction information received from the client-site interaction module 180 for processing as previously described with respect to the system 100 of FIG. 1.

Figure 4:
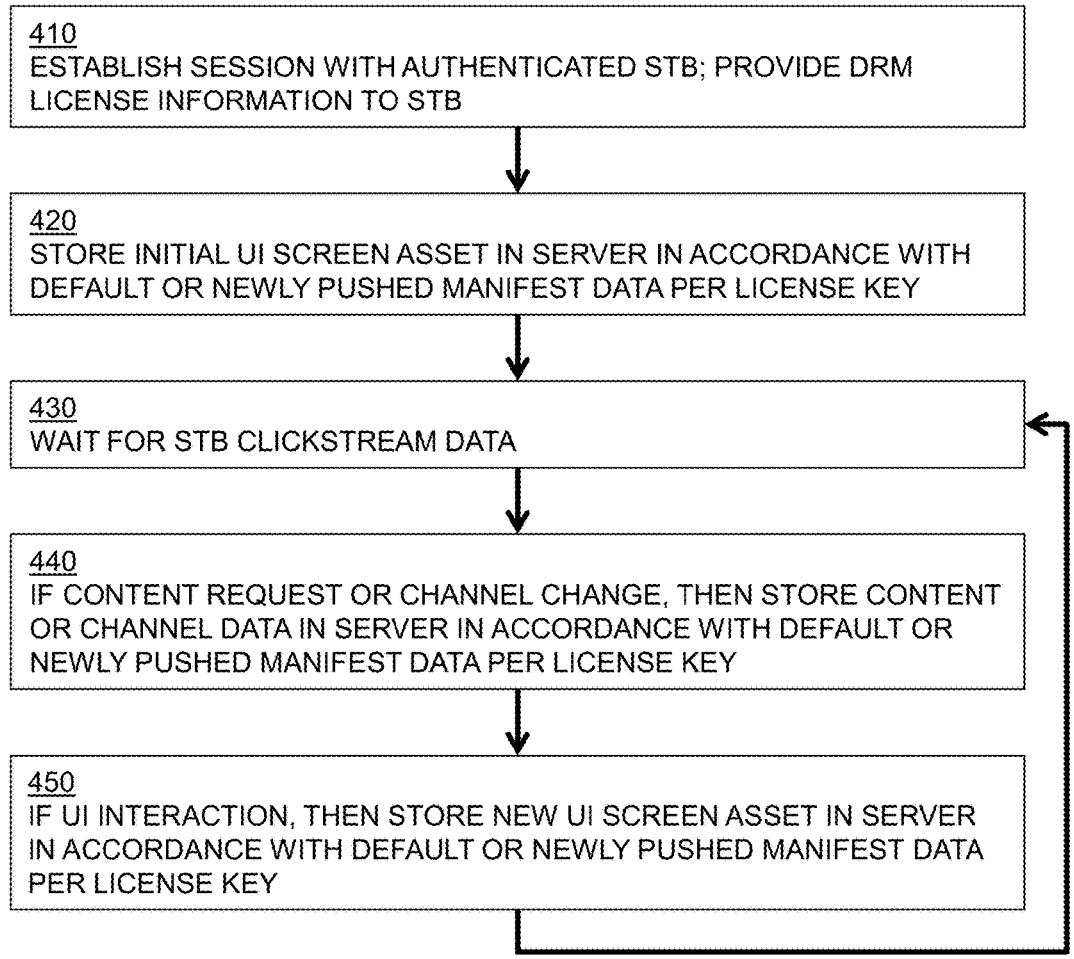
FIGS. 4-5 depict flow diagrams of method according to various embodiments.

FIG. 4 depicts a flow diagram of a method according to one embodiment. Specifically, the method 400 of FIG. 4 is suitable for use within the context of a head end configured in accordance with the embodiments described above with respect to at least FIGS. 1-2.

At step 410, the head end establishes a session with an authenticated client device, illustratively a set top box (STB). Further, DRM license information is divided to the STB.

At step 420, an initial user interface (UI) screen asset (or links thereto) is stored at stream server 110 in accordance with a default or newly pushed manifest data, and in accordance with an appropriate license key.

At step 430, the head and wait for clickstream data (i.e., data indicative of user interaction) to be received by, illustratively, the user interaction module 130 of head end 101.

At step 440, if the received clickstream data is indicative of a content request or channel change, then corresponding content or new channel asset (or links thereto) is stored at stream server 110 in accordance with a default or newly pushed manifest data, and in accordance with the appropriate license key.

At step 450, if the retrieved clickstream data is indicative of a user interface or program guide interaction, then a corresponding UI screen asset (or links thereto) is stored at stream server 110 in accordance with a default or newly pushed manifest data, and in accordance with the appropriate license key.

The method 400 then returns to step 430 to wait for the next STB clickstream data.

Figure 5:
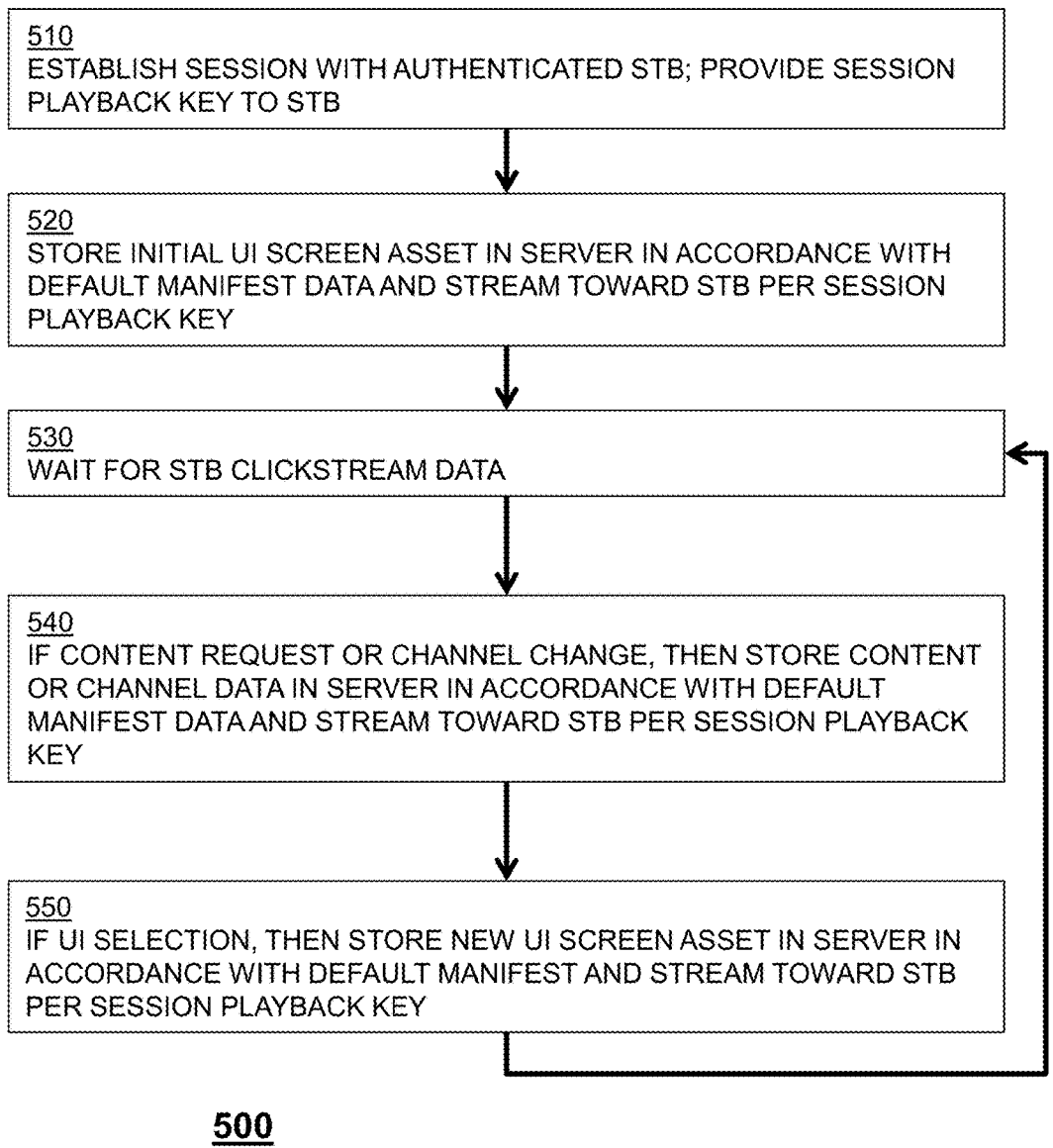

FIG. 5 depicts a flow diagram of a method according to one embodiment. Specifically, the method 500 of FIG. 5 is suitable for use within the context of a head end configured in accordance with the embodiments described above with respect to at least FIG. 3.

At step 510, the head end establishes a session with an authenticated client device, illustratively a set top box (STB). Further, a session playback key is provided to the STB.

At step 520, an initial user interface (UI) screen asset (or links thereto) is stored at stream server 110 in accordance with default manifest data and streamed toward the STB in accordance with the session playback key.

At step 530, the head and wait for clickstream data (i.e., data indicative of user interaction) to be received by, illustratively, the user interaction module 130 of head end 101.

At step 540, if the received clickstream data is indicative of a content request or channel change, then corresponding content or new channel asset (or links thereto) is stored at stream server 110 in accordance with default manifest data and streamed toward the STB in accordance with the session playback key.

At step 550, if the retrieved clickstream data is indicative of a user interface or program guide interaction, then a corresponding UI screen asset (or links thereto) is stored at stream server 110 in accordance with default manifest data and streamed toward the STB in accordance with the session playback key.

The method 500 then returns to step 530 to wait for the next STB clickstream data.

Advantageously, the various embodiments described herein enable a shifting of resources from CPE such as client device 102 toward PE such as a head end 101 to perform channel changing and other functions within the context of a robust DRM and subscriber management environment, thereby improving system, client device and service capability as well as improving delivery time frame of the various services. For example, by terminating DRM associated with content at the head end 101, and using session-based DRM at the client device, the implementation of the DRM solution is greatly simplified. Further, the various embodiments enable a broader set of client devices to be used within the context of an IP based system.

The various embodiments described herein generally provide a system in which channel change logic (CCL) is implemented in the head end (i.e., remote from the relevant STB/CPE) and primarily used to generate a single video delivery stream between the headend and the STB. In various embodiments, the video delivery stream for a STB may change, and the CCL is used to deliver a manifest configured to cause the STB to switch between processing a first or initial content-bearing video stream received from the head end to processing a second or next content-bearing video received from the head end. In various embodiments, where the CCL has knowledge of which channels are being used and which are not, those channels not currently in use may be powered down or otherwise turned off to conserve resources.

The various embodiments described herein generally provide a system in which digital rights management (DRM) or other content protection mechanisms are managed in the head end, and where the STB uses a simplified DRM model in which knowledge of this DRM processing is not needed. For example, by controlling the authentication of an STB and delivery of content to that STB via an agreed upon channel in accordance with DRM requirements, the head end provides only the appropriate content, broadcast television channels and so on to the STB.

Figure 6:
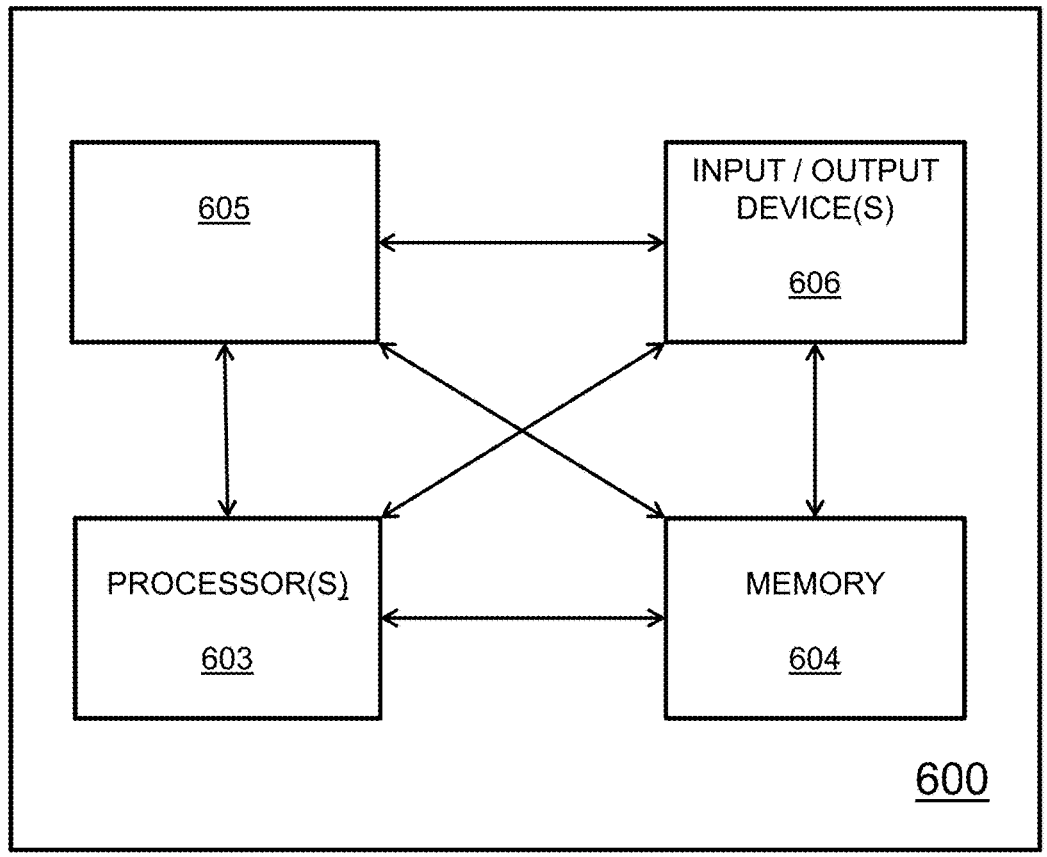
FIG. 6 depicts a high-level block diagram of a computing device suitable for use in performing the functions described herein.

FIG. 6 depicts a high-level block diagram of a computing device, such as a processor in a data center, head end, client device and the like suitable for use in performing functions described herein such as those associated with the various elements described herein with respect to the figures.

In particular, any of the various functional entities described herein, such as provider equipment (PE), customer premises equipment (CPE), network routing entities, network management entities, server devices, client devices and so on as described herein may be implemented in accordance with a general computing device structure such as described herein with respect to FIG. 6.

As depicted in FIG. 6, computing device 600 includes a processor element 603 (e.g., a central processing unit (CPU) or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A system, comprising:
   at a head end, an authentication and authorization module (AAM), configured to establish respective sessions with each of a plurality of client devices by defining for each client device a respective transmission channel for transmitting video streams thereto, and a respective session playback key configured to enable decryption of encrypted video stream portions received by the client device;
   at said head end, a stream server configured for transmitting toward each client device via respective transmission channel a respective video stream comprising a sequence of encrypted video stream portions stored in respective storage locations at a head end as indicated by a respective client device manifest stored at said head end;
   at said head end, a manifest creation and manipulation module configured for adapting client device manifests in response to respective client device selection data indicative of a desired new video stream; and
   at said head end, an interaction module configured for receiving data indicative of user interactions at a client device.

2. The system of claim 1, wherein said client device selection data indicative of a desired new video stream comprises a channel change request, said manifest being adapted to indicate video stream segments associated with a new channel.

3. The system of claim 1, wherein said client device selection data indicative of a desired new video stream comprises a content request, said manifest being adapted to indicate video stream segments associated with said requested content.

4. The system of claim 1, wherein said client device selection data indicative of a desired new video stream comprises a user interface (UI) selection associated with a new UI screen, said manifest being adapted to indicate video stream segments associated with said new UI screen.

5. The system of claim 1, wherein said stream server initially transmits a sequence of video stream portions representing an initial user interface (UI) screen.

6. The system of claim 1, wherein each client device manifest defines a sequence of video stream portions including at least one video stream portion available at multiple bitrates.

7. The system of claim 1, wherein each of said storage locations is associated with a uniform resource locator (URL), each client device manifest being configured to enable said stream server to retrieve said video stream portions in a correct sequence and at a desired available bitrate.

8. The system of claim 1, wherein each client device manifest defines a sequence of video stream portions including at least one video stream portion available at multiple bitrates.

9. A system, comprising: at a head end, an authentication and authorization module (AAM), configured to establish respective sessions with at least one client device by defining for each client device a respective transmission channel for transmitting video streams thereto, and a respective session playback key configured to enable decryption of encrypted video stream portions received by the client device;
   at said head end, a stream server configured for transmitting toward each client device via respective transmission channel a respective sequence of encrypted video stream portions as defined by a respective client device manifest, each sequence of encrypted video stream portions being configured for decryption via said respective session playback key;
   at said head end, a manifest creation and manipulation module configured for adapting client device manifests in response to respective client device selection data indicative of a desired new video stream and a license key; and
   at said head end, an interaction module configured for receiving data indicative of user interactions at a client device.

10. The system of claim 9, wherein said client device selection data indicative of a desired new video stream comprises a content request, said manifest being adapted to indicate video stream segments associated with said requested content.

11. The system of claim 9, wherein said client device selection data indicative of a desired new video stream comprises a user interface (UI) selection associated with a new UI screen, said manifest being adapted to indicate video stream segments associated with said new UI screen.

12. A method of securely delivering content, comprising:
    transmitting, from a head end toward each of a plurality of client devices, a digital rights management (DRM) license key configured to enable decrypting of video stream portions by a video decoder of an authorized client device, said video stream portions being stored in respective storage locations at said head end as indicated by a respective client device manifest stored at said head end, said video stream portions being transmitted toward each respective client device via a respective transmission channel;
    receiving, from an authorized client device, clickstream data indicative of user interaction with said authorized client device to select thereby a video stream;
    adapting a respective client device manifest in response to respective client device clickstream data indicative of a desired new video stream; and storing, in said plurality of default storage locations, respective portions of said user selected video stream.

13. The method of claim 12, further comprising:
for each client device, establishing a respective session between said head end and said client device to enable communications therebetween, and initially storing, in said plurality of default storage locations, respective portions of a video stream representing an initial user interface (UI) screen.

14. The method of claim 12, wherein said manifest defines a sequence of video stream portions including at least one video stream portion available at multiple bitrates.

15. The method of claim 14, wherein each of said storage locations is associated with a uniform resource locator (URL), said manifest being configured to enable said client device to retrieve said video stream portions in a correct sequence and at a desired available bitrate.

16. The method of claim 12, wherein said manifest is located at said client device, said method further comprising transmitting toward said client device updated manifest data configured to cause said client device to retrieve video stream portions from different storage locations at said head end.

17. An apparatus for securely delivering content, the apparatus comprising:
a processor configured for:
transmitting, from a head end toward each of a plurality of client devices, a digital rights management (DRM) license key configured to enable decrypting of video stream portions by a video decoder of an authorized client device, said video stream portions being stored in respective storage locations at said head end as indicated by a respective client device manifest stored at said head end, said video stream portions being transmitted toward said respective client device via a respective transmission channel;
receiving, from an authorized client device, clickstream data indicative of user interaction with said authorized client device to select thereby a video stream;
adapting a respective client device manifest in response to respective client device clickstream data indicative of a desired new video stream; and
storing, in said plurality of default storage locations, respective portions of said user selected video stream.

18. A tangible and non-transient computer readable storage medium storing instructions which, when executed by a computer, adapt the operation of the computer to perform a method of securely delivering content, the method comprising:
transmitting, from a head end toward each of a plurality of client devices, a digital rights management (DRM) license key configured to enable decrypting of video stream portions by a video decoder of an authorized client device, said video stream portions being stored in respective storage locations at said head end as indicated by a respective client device manifest stored at said head end, said video stream portions being transmitted toward said respective client device via a respective transmission channel;
receiving, from an authorized client device, clickstream data indicative of user interaction with said authorized client device to select thereby a video stream;
adapting a respective client device manifest in response to respective client device clickstream data indicative of a desired new video stream; and
storing, in said plurality of default storage locations, respective portions of said user selected video stream.

* * * * *